(12) United States Patent
Isaac et al.

(10) Patent No.: US 6,647,531 B2
(45) Date of Patent: Nov. 11, 2003

(54) CUSTOMIZATION OF NETWORK DOCUMENTS

(75) Inventors: Steven A. Isaac, Bellevue, WA (US); Mark B. Grossman, Kirkland, WA (US); Ron E. Critchfield, Redmond, WA (US); Michael H. Tuchen, Seattle, WA (US); James S. Gwertzman, Seattle, WA (US); Paul A. McDaniel, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 10/154,619

(22) Filed: May 22, 2002

(65) Prior Publication Data

US 2002/0143853 A1 Oct. 3, 2002

Related U.S. Application Data

(63) Continuation of application No. 09/464,165, filed on Dec. 15, 1999, now Pat. No. 6,424,981, which is a continuation of application No. 08/761,566, filed on Dec. 6, 1996.

(51) Int. Cl.[7] .............................................. G06F 17/21
(52) U.S. Cl. ..................................... 715/501.1; 715/513
(58) Field of Search ............................ 715/501.1, 513, 715/530, 531; 709/201

(56) References Cited

U.S. PATENT DOCUMENTS

| | | | |
|---|---|---|---|
| 5,617,565 A | 4/1997 | Augenbraun et al. | 707/4 |
| 5,727,129 A | 3/1998 | Barrett et al. | 706/10 |
| 5,740,252 A | 4/1998 | Minor et al. | 380/49 |
| 5,740,549 A | 4/1998 | Reilly et al. | 705/14 |
| 5,774,670 A | 6/1998 | Montulli | 395/200.57 |
| 5,796,395 A | 8/1998 | De hond | 345/331 |
| 5,819,284 A | 10/1998 | Farber et al. | 707/104 |
| 5,826,242 A | 10/1998 | Montulli | |
| 5,848,396 A | 12/1998 | Gerace | 705/10 |
| 5,862,325 A * | 1/1999 | Reed et al. | 709/201 |
| 5,933,811 A | 8/1999 | Angles et al. | 705/14 |
| 5,983,227 A | 11/1999 | Nazem et al. | 707/10 |
| 6,424,981 B1 * | 7/2002 | Isaac et al. | 715/513 |

OTHER PUBLICATIONS

Markoff (1999) "Microsoft Will Alter Its Software In Response to Privacy Concerns" *The New York Times*, Mar. 6, 1999.
(Nov. 30, 1995), Microsoft Unveils Enhanced World Wide Web Site>MSFT, Dow Jones News Service, Copyright © 1995, Dow Jones & Company, Inc.
(Nov. 30, 1995), MSN, The Microsoft Network Offers Enhanced World Wide Web Site, PR newswire, Copyright © 1995).
(Nov. 30, 1995), Microsoft Network Adds Multimedia Chat Service, Newsbytes News Network, .
"Persistent client state HTTP cookies", http://oradbl.jinr.ru/netscape/MISC/cookie spec.htm, Aug. 24, 1996, pp1–5.
Amdur, "New sites aim to personalize web navigation", *Information & Interactive Services Report*, BRP Publications, vol. 17, issue 31, Sep. 1996, pp. 1–5.
Herzoff, "Cookies are not always a treat for Web users", Netowrk World, Nov. 1996, p. 38.
O'Brien, "How to put together an Internet Web site—Cookies keep'em coming back for more", InterActivity, Jun. 1996, v2n6, pp. 59–61.
"Proposal for Extending Persistent Clinet State HTTP Cookies", http://www.sbm.temple.edu/~magnus/ext cookie spec. html, Mar. 29, 1996, pp 1–7. 1–5 .59–61.

* cited by examiner

*Primary Examiner*—Stephen S. Hong
(74) *Attorney, Agent, or Firm*—Klarquist Sparkman, LLP

(57) ABSTRACT

User-selected customization information for a network (e.g., HTML) document is stored at a server with reference to user identifying information that uniquely identifies the user. Whenever the user navigates back to the network address of the HTML document, the user is identified automatically and receives a customized HTML document formed in accordance with the customization information.

16 Claims, 6 Drawing Sheets

CUSTOMIZATION OF NETWORK DOCUMENTS

CROSS REFERENCE TO RELATED APPLICATION

This application is a continuation of U.S. patent application Ser. No. 09/464,165, filed Dec. 15, 1999, now U.S. Pat. No. 6,424,981 which is a continuation of U.S. patent application Ser. No. 08/761,566, filed Dec. 6, 1996.

FIELD OF THE INVENTION

This invention relates generally to providing information to a user who accesses a document at a site on a computer network like the Internet or an intranet and, in particular, to automatically providing selected or customized information to the user.

BACKGROUND AND SUMMARY OF THE INVENTION

The Internet is a well known global network of cooperatively interconnected computer networks. The world wide web portion of the Internet is a collection of server computers (referred to as "sites") on the Internet which store HTML documents that can be publicly accessed by computer users having a connection to the Internet. There are many such world wide web sites on the Internet.

Software, generally known as "Internet browsers," is now in wide-spread use for retrieving (also known as "downloading") from the world-wide web and viewing electronic documents in hyper-text markup language (HTML) format. Originally, these HTML documents were simply ASCII coded character files generally consisting of text and HTML "tags" that specify formatting of the document, links (referred to as "hyper-links") to related documents on the network, and other files that contain information (e.g., sound, images, video, etc.) to be combined into the document. Typical HTML documents found on the world wide web, sometimes referred to as web pages, include both text and tags specifying files for images that are to be displayed with the text. In use, browser software allows a user to navigate (also known as "browse") between documents and sites on the world-wide web.

Conventional HTML documents found on the world wide web are static in that the document is simply transferred to each user who navigates to the document. Although the document may include images or other media formats, the HTML document transferred to each user is the same. The strength of such a document format is that it includes links to other documents or sites by which the user can navigate to a desired document or site.

A common type of document on the world-wide web is the top-level or trunk document for a particular site, often referred to as its home page. A home page typically provides a user who accesses it with general information about the provider of the network site and organizational information about, and access to, lower levels the network site. Another common type of document provides users with a convenient gateway to the world wide web. These types of documents commonly provide access to network search tools or services, news or other current event highlights, links to other sites of interest, etc. Such a network gateway type document may be a home page or a lower-level document for a particular network site.

It is a shortcoming of conventional HTML documents that all users who access a document receive the same information and links. In the context of a home page or a network gateway document, the static nature of HTML documents requires that only generalized information and links are included in the document so that it appeals to the widest base of users. Excessive information and links in the document would cause it to be too large to be practicable for most users. For users accessing the world-wide web over conventional "POTS" telephone connections and modems, excessively large HTML documents can require more time for transmission than many users are willing to accept.

To overcome these shortcomings of conventional HTML documents, an HTML document customization method obtains and stores for a user customizing information for a customizable HTML document on a computer network like the Internet or an Intranet. The customizable HTML document may be a top-level, trunk, or home page for a network site or a world-wide web gateway, or could be of any level at the network site and provide virtually any functionality of an HTML document.

One aspect of the method occurs when a user navigates to the network address (e.g., Uniform Resource Locator) associated with the customizable HTML document and is offered the ability to customize the HTML document. The user might not have been to the network address before, or not elected to customize the HTML document during a previous access of it, or will elect to revise customization options selected for the HTML document during a previous access of it. The server returns an HTML customization document to the user. In one embodiment, the HTML customization document is an HTML form that includes topical groupings of customization options relating to, for example, favorite links, news, sports, financial matters, entertainment, science and technology, life, weather, etc. that a user selects with graphical check boxes, buttons, etc. The customization options may relate to links to sites that provide information on indirect links to the selected topics. In addition, the HTML customization document can allow the user to designate specific network addresses or URLs to be included on the customized HTML document. The user returns the selected customization options to the server as customization information.

The customization information is stored at the server with reference to user identifying information that uniquely identifies the user, and the server returns the user identifying information to the user (i.e., the browser on the user computer or client). In one embodiment, the user identifying information is customization persistent client state information, sometimes referred to as a "cookie." The customization persistent client state information is or includes, for example, 128-bit globally unique identifiers ("GUID") that are capable of uniquely identifying each and every user.

Whenever the user navigates back to the network address associated with the customizable HTML document, the browser on the user client passes the customization persistent client state information or "cookie" back to the server. The server correlates the customization persistent client state information with the customization options stored at server and returns to the user client a customized HTML document formed in accordance with the customized options stored at server. The customized HTML document may include information on the selected topics, obtained from other sites, for example, or direct links to the other sites that have the information.

This HTML or network document customization is capable or providing each user who accesses a network address with an HTML document that is matched to that user's preferences. This customization adds to the strength of linked information provided by HTML documents by providing each user with the information, or links to information, that the user actually wants. Customization of HTML documents is particularly beneficial for home pages, network gateway pages, or any other pages that potentially provide direct access to a wide variety of links or information.

Additional features and advantages of the invention will be made apparent from the following detailed description of an illustrated embodiment which proceeds with reference to the accompanying drawings.

DETAILED DESCRIPTION OF EMBODIMENT

Figure 1:
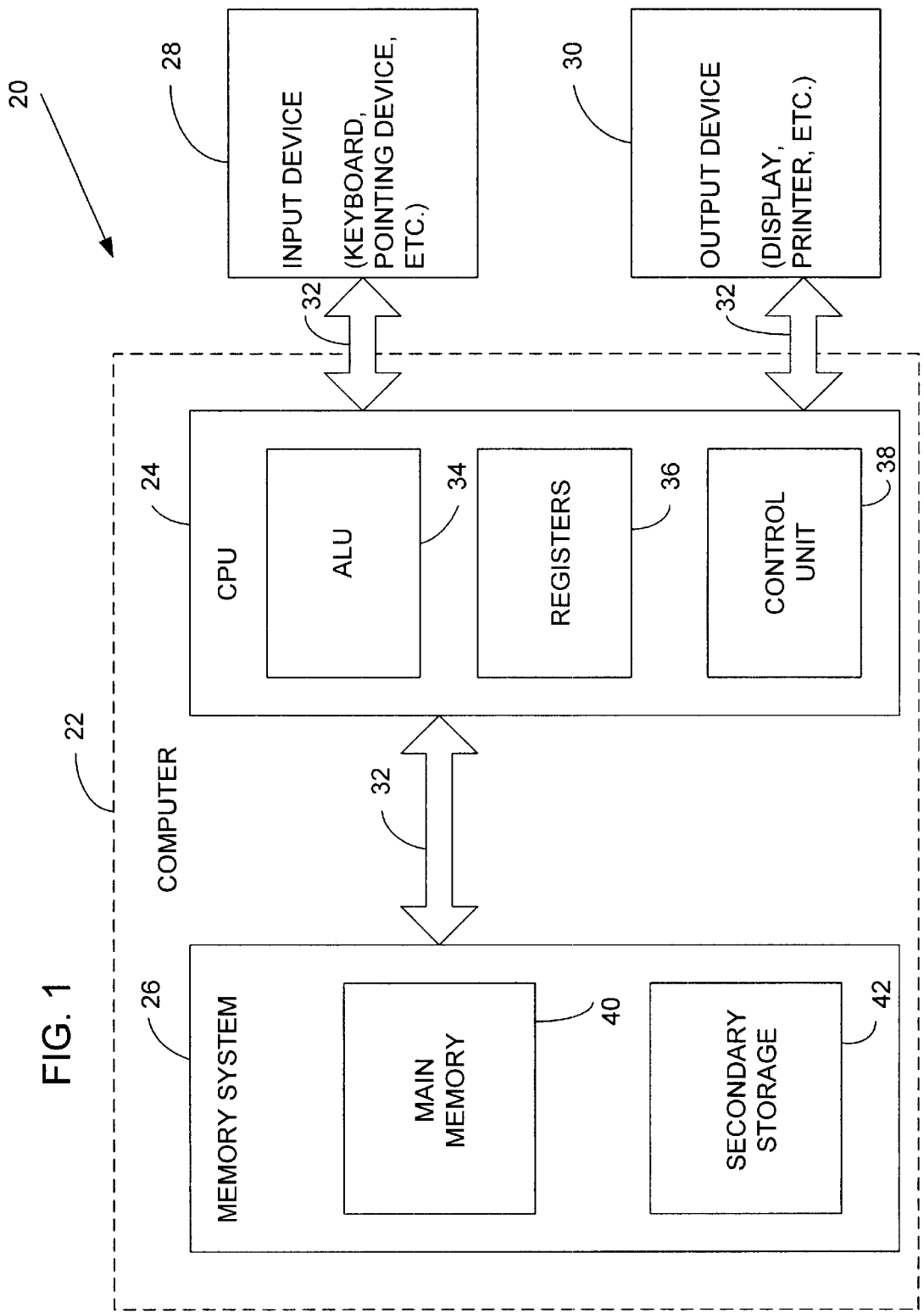
FIG. 1 is a block diagram of a computer system that may be used to implement a method and apparatus embodying the invention.

Referring to FIG. 1, an operating environment for an illustrated embodiment of the present invention is a computer system 20 with a computer 22 that comprises at least one high speed processing unit (CPU) 24, in conjunction with a memory system 26, an input device 28, and an output device 30. These elements are interconnected by at least one bus structure 32.

The illustrated CPU 24 is of familiar design and includes an ALU 34 for performing computations, a collection of registers 36 for temporary storage of data and instructions, and a control unit 38 for controlling operation of the system 20. The CPU 24 may be a processor having any of a variety of architectures including Alpha from Digital, MIPS from MIPS Technology, NEC, IDT, Siemens, and others, x86 from Intel and others, including Cyrix, AMD, and Nexgen, and the PowerPc from IBM and Motorola.

The memory system 26 generally includes high-speed main memory 40 in the form of a medium such as random access memory (RAM) and read only memory (ROM) semiconductor devices, and secondary storage 42 in the form of long term storage mediums such as floppy disks, hard disks, tape, CD-ROM, flash memory, etc. and other devices that store data using electrical, magnetic, optical or other recording media. The main memory 40 also can include video display memory for displaying images through a display device. Those skilled in the art will recognize that the memory 26 can comprise a variety of alternative components having a variety of storage capacities.

The input and output devices 28, 30 also are familiar. The input device 28 can comprise a keyboard, a mouse, a physical transducer (e.g., a microphone), etc. The output device 30 can comprise a display, a printer, a transducer (e.g., a speaker), etc. Some devices, such as a network interface or a modem, can be used as input and/or output devices.

As is familiar to those skilled in the art, the computer system 20 further includes an operating system and at least one application program. The operating system is the set of software which controls the computer system's operation and the allocation of resources. The application program is the set of software that performs a task desired by the user, using computer resources made available through the operating system. Both are resident in the illustrated memory system 26. Preferably, the operating system employs a graphical user interface where the display output of an application program is presented in a rectangular area (sometimes referred to as a "Window") on the screen of the output device 30 and is also multi-tasking (allowing application programs to execute computing tasks in multiple threads), such as Microsoft Corporation's Windows® 95 or Windows® NT operating system, IBM's OS/2 Warp operating system, Apple's Macintosh System 7 operating system, X-Windows, etc.

In accordance with the practices of persons skilled in the art of computer programming, the present invention is described below with reference to acts and symbolic representations of operations that are performed by computer system 20, unless indicated otherwise. Such acts and operations are sometimes referred to as being computer-executed. It will be appreciated that the acts and symbolically represented operations include the manipulation by the CPU 24 of electrical signals representing data bits which causes a resulting transformation or reduction of the electrical signal representation, and the maintenance of data bits at memory locations in memory system 26 to thereby reconfigure or otherwise alter the computer system's operation, as well as other processing of signals. The memory locations where data bits are maintained are physical locations that have particular electrical, magnetic, or optical properties corresponding to the data bits.

Figure 2:
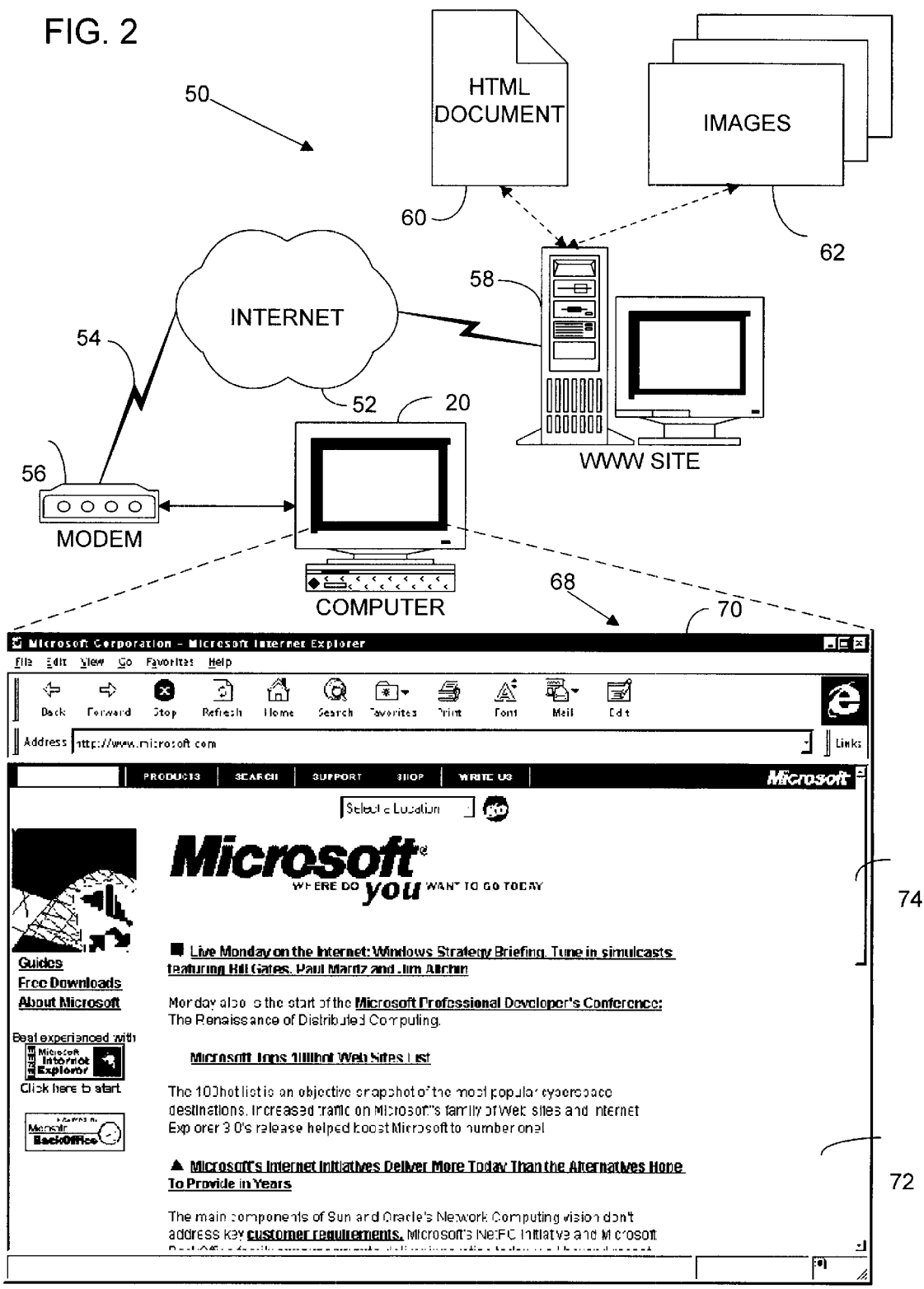
FIG. 2 is a block diagram of the computer system of FIG. 1 connected to a remote computer network (e.g., the Internet) for locally browsing electronic documents residing at a remote computer site.

FIG. 2 shows a browsing environment 50 in which computer 20 (FIG. 1) as a client runs software, referred to herein as a "browser," for unified browsing of electronic documents and other data from local sources (e.g., the secondary storage 42 of FIG. 1) and from a remote computer network 52. The browser can be integrated with the operating system software, or can be separate application software. The illustrated remote computer network 52 may be the Internet or an intranet. In the illustrated browsing environment 50, the computer 20 connects to the computer network 52 over a telephone line 54 with a modem 56. Other physical connections to the computer network alternatively can be used, such as an ISDN, T1 or like high speed telephone line and modem, a television cable and modem, a satellite link, an optical fiber link, an Ethernet or other local area network technology wire and adapter card, radio or optical transmission devices, etc. The invention can alternatively be embodied in a browsing environment for other public or private computer networks, such as a computer network of a commercial on-line service or an internal corporate local area network (LAN), an intranet, or like computer network.

Documents for browsing with the illustrated browser can reside as files of a file system stored in the computer's secondary storage 42 (FIG. 1), or reside as resources at a remote computer 58 (also referred to as a "site" or server) connected to the computer network 52, such as a world-wide web site on the Internet. The illustrated document 60 residing at the site 58 conforms with HTML standards, and may include extensions and enhancements of HTML standards. However, the illustrated browser also can browse documents having other data formats (e.g., Microsoft® Word documents, etc.) from the computer 20 or remote computer 58. In conformance with HTML, the illustrated document 60 can incorporate other additional information content 62, such as images, audio, video, executable programs, etc. (hereafter simply "images" 62), which also reside at the remote computer 58. The document 60 and images 62 preferably are stored as files in a file system of the remote computer 58. The document 60 incorporates the images 62 using HTML tags that specify the location of files or other Internet resource containing the images on the Internet 52.

When used for browsing documents, the illustrated browser displays the document in a window 68 or rectangular area of the computer's display 30 allocated to the browser by the operating system. The illustrated window 68 comprises a frame 70, a document display area 72, and user interface controls 74. The browser displays the document within the document display area 72 of the window 68.

Figure 3:
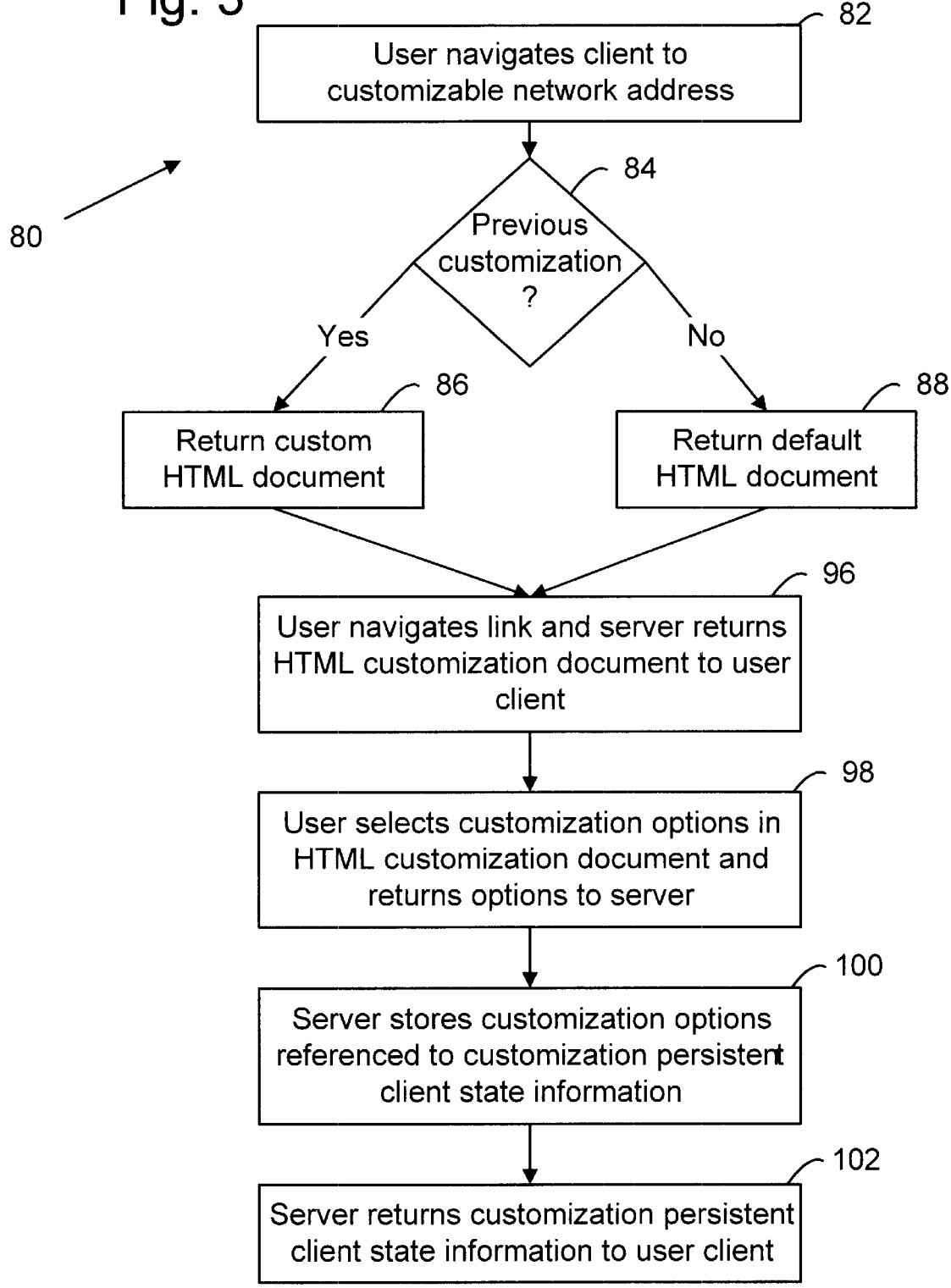
FIG. 3 is a flow diagram representing an HTML document customization method.

FIG. 3 is a flow diagram of an HTML document customization method 80 by which customizing information for a customizable HTML document on computer network 52 is obtained and stored for a user of client 20. The customizable HTML document is described as a top-level, trunk, or home page for site 58 functioning as a world wide web gateway. It will be appreciated, however, that the customizable HTML document could alternatively be of any level at site 58 and provide virtually any functionality of an HTML document.

Process block 82 indicates that a user navigates client 20 to the network address (e.g., Uniform Resource Locator) of customizable HTML document at site 58. Client 20 in this step might not been to the network address before, or might not have elected to customize the HTML document during a previous access of it, or might have elected to customize the HTML document during a previous access of it.

Decision block 84 represents an inquiry whether client 20 has customized the HTML document during a previous access of it. Decision block 84 proceeds to process 86 if client 20 has customized the HTML document during a previous access of it, and otherwise proceeds to process block 88.

Figure 4:
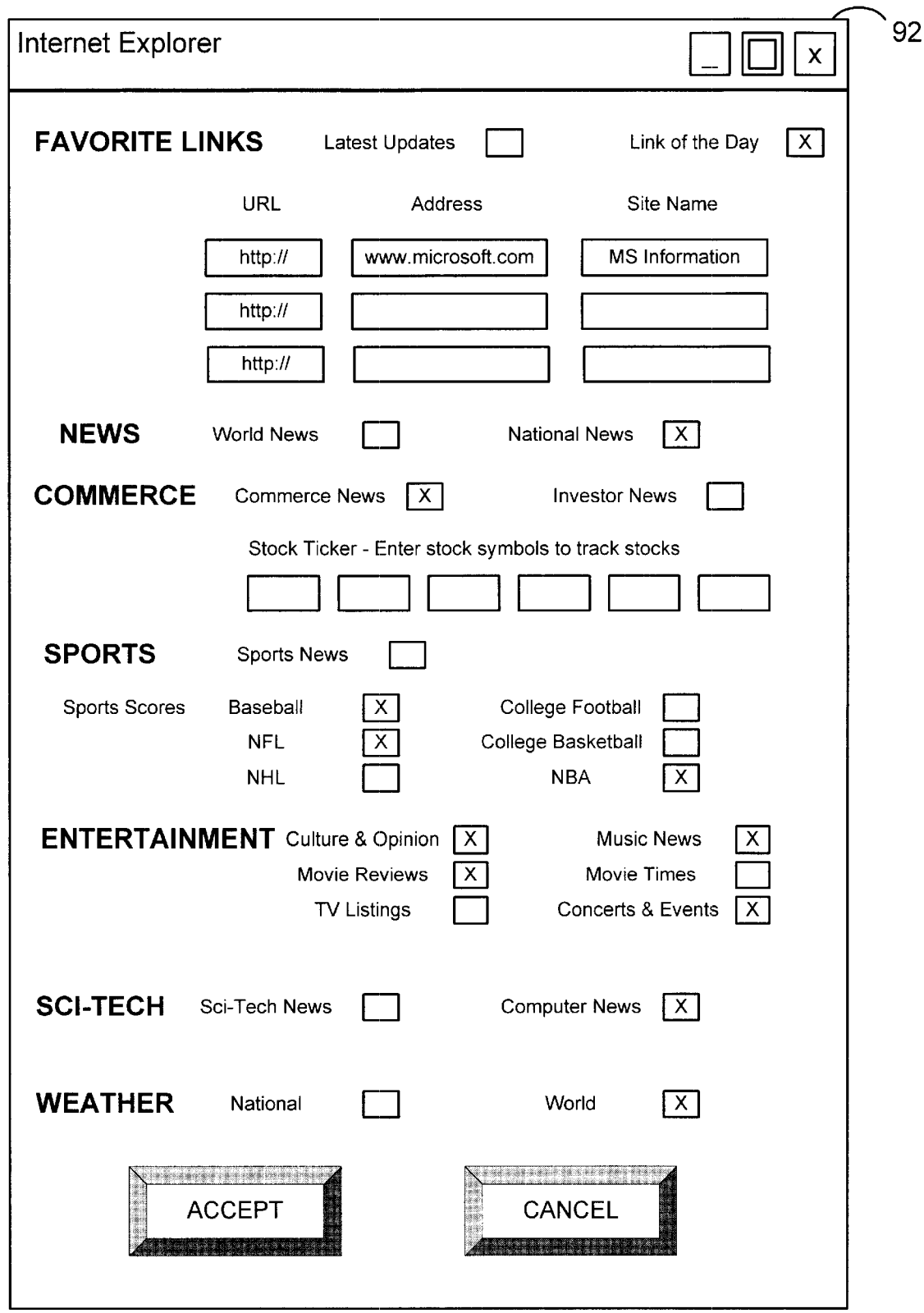
FIG. 4 is an illustration of a simplified HTML customization document as it would appear when rendered on the display of a user's computer.

Process block 86 indicates that server 58 returns a customized HTML document to client 20 via the browser. The customized HTML document includes a link by which the user can navigate to an HTML customization document 92 (FIG. 4).

Process block 88 indicates that server 58 returns a default HTML document (not shown) to client 20 via the browser. The default HTML document includes a link by which the user can navigate to HTML customization document 92.

Process block 96 indicates that the user navigates or activates the link to HTML customization document 92 so that server 58 returns the document to user client 20. In one embodiment, HTML customization document 92 is an HTML form that includes topical groupings of customization options relating to, for example, news, sports, financial matters, entertainment, science and technology, life, weather, etc. (not all of which are shown), that a user selects with graphical check boxes, buttons, etc. The customization options may relate to links to sites that provide information on, or direct links to, the selected topics. In addition, HTML customization document 92 can allow the user to designate specific URLs to be included on the customized document. The user returns the selected customization options to server 58 as customization information.

Process block 98 indicates that the user selects customization options and returns them to server 58. Process block 100 indicates that the customization information is stored at server 58 with reference to user identifying information that uniquely identifies the user. Process block 102 indicates that server 58 returns the user identifying information to the browser on user client 20. In one embodiment, the user identifying information is customization persistent client state information, sometimes referred to as a "cookie." The customization persistent client state information is or includes, for example, 128-bit globally unique identifiers ("GUID") that are capable of uniquely identifying each user that elects customization. Such identifiers may be created for example with a function callnamed "CoCreateGUID" from the Win32™ library of functions available in the Windows 95 and Windows NT operating systems available from Microsoft Corporation.

Although described as using a persistent client state to carry identifying information between user client 20 and server 58, the customization of HTML or other network documents is substantially independent of how the identifying information is conveyed between user client 20 and server 58. The information can be conveyed in any of a wide variety of forms or formats, including basic authentication as set forth in the hypertext transfer protocol standard (e.g., HTTP 1.1), any other client certification standards, or even simple usernames or passwords. Utilization of usernames and passwords for identifying clients is incorporated, for example, in the Internet Information Server (IIS) feature in the Windows™ NT operating system of Microsoft Corporation. With identifying information from the user, regardless of the format or manner conveyed, the customization options selected by a user can be correlated with and returned to that user.

A persistent client state, or "cookie," is generally arbitrary text information (e.g., of up to 255 characters) returned to user client 20 by server 58 when it is accessed by user client 20. The information includes one or more network addresses (e.g., Uniform Resource Locators, URLs) for which the persistent client state is applicable. For a browser that accommodates client states, user client 20 stores the client state information. On subsequent accesses of any of the specified network addresses by the browser on user client 20, selected information in the client state is returned to server 58. A benefit of using a persistent client state to carry the information is that it is automatic and transparent to the user.

A persistent client state is specified by a Set-Cookie HTTP response header of the form:

Set-Cookie: name=VALUE; expires=DATE;
path=PATH;domain=DOMAIN_NAME; secure.

For example, when it requests an HTML document from a network address on server 58, the browser determines whether the address matches or corresponds to the addresses or paths specified in any of the stored persistent client states. For each persistent client state matching or corresponding to the address, the browser transmits the name and value of the persistent client state with the HTML document request. The format of the transmission is:

Cookie: name1=VALUE1; name2=VALUE2; . . .

The attributes of the Set-Cookie header are:
name=VALUE
  This attribute specifies the name and content of the persistent client state data and is the only required attribute on the Set-Cookie header. The name and its value can be any sequence of characters, except semicolon, comma and white space. For example, this attribute can have the name 'User' and the content or value can be a 128-bit globally unique identifier ("GUID") referenced to the time the user accesses the network address.

expires=DATE

This attribute specifies an expiration date for the persistent client state. After expiration, the persistent client state is no longer stored or returned to the server at the originating network address. The DATE is formatted as:

Wdy, DD-Mon-YYYY HH:MM:SS GMT

If this attribute is not set, then the persistent client state expires immediately after leaving the specified network address. Accordingly, this attribute is set to allow customization information to be retrieved for a user during subsequent accesses of the specified network addresses.

domain=DOMAIN_NAME

This attribute specifies a top level or "tail" domain to be initially examined when searching for a valid persistent state client in a list of persistent state clients. The top level or "tail" domain requires at least three periods, such as ".custom.home.uk," except that only two periods are required in the top level domains "com", "edu", "gov", "int", "mil", "net", and "org". A persistent state client with a matching top level domain match proceeds to path matching. The default value of this attribute is the host name of the server generating the persistent state client.

path=PATH

The path attribute specifies the network addresses (e.g., URLs) within a domain for which the persistent state client is valid (i.e., returned by the browser on user client 20 when the specified network address is requested or accessed). The format for this attribute is 'path=/foo', and the persistent state client is returned only if the browser requests a network address (e.g., URL) in the path '/foo' or lower, such as '/foo/default'. The most general specification is 'path=/'. If this attribute is not specified, the default path is the same as the path for the document with which the persistent client state is associated.

secure

If this attribute is set, the persistent state client is transmitted from user client 20 only if the communication channel with server 58 is secure (e.g., utilizing a secure socket layer). If this attribute is not specified, the persistent client state is sent regardless of the security of the channel.

Figure 5:
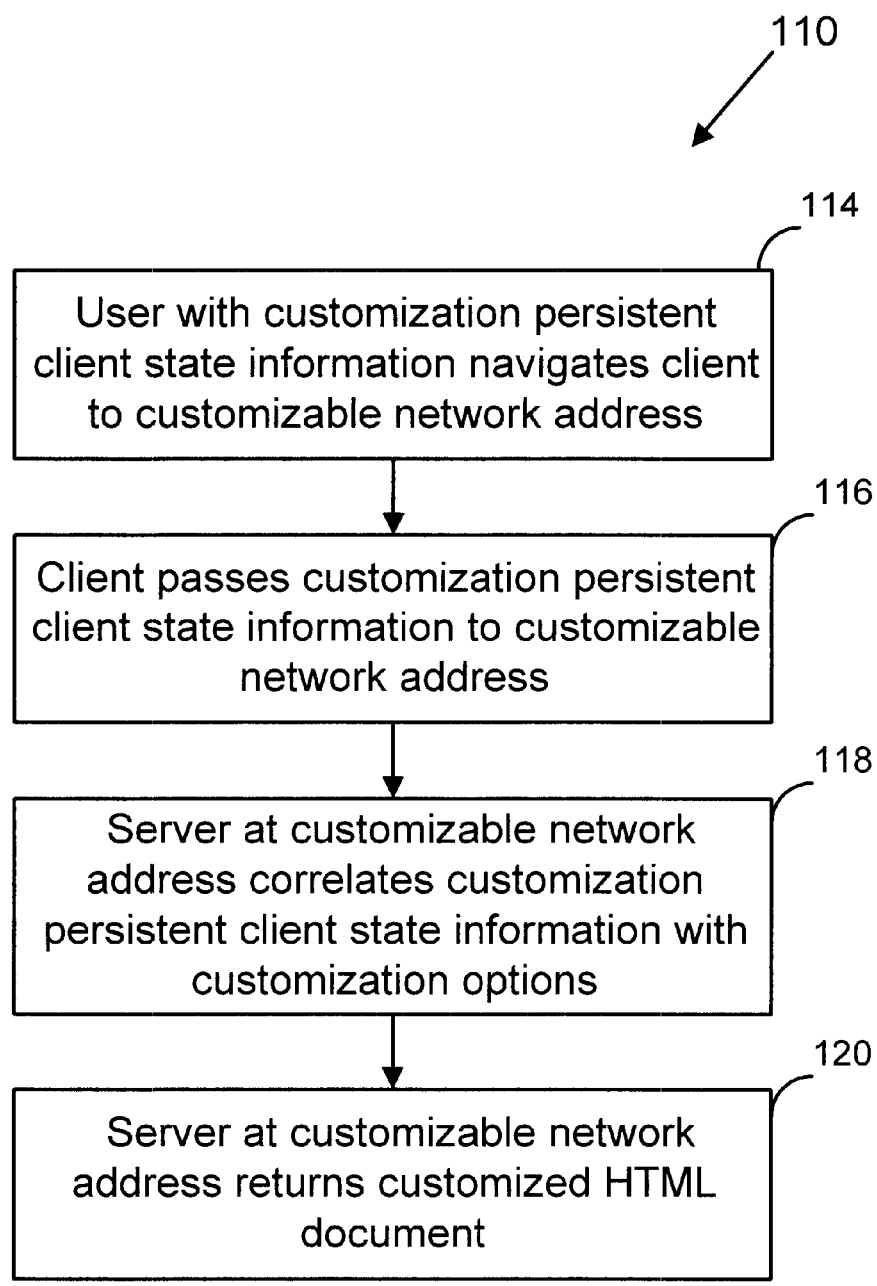
FIG. 5 is a flow diagram of a customized HTML document delivery method.
Figure 6:
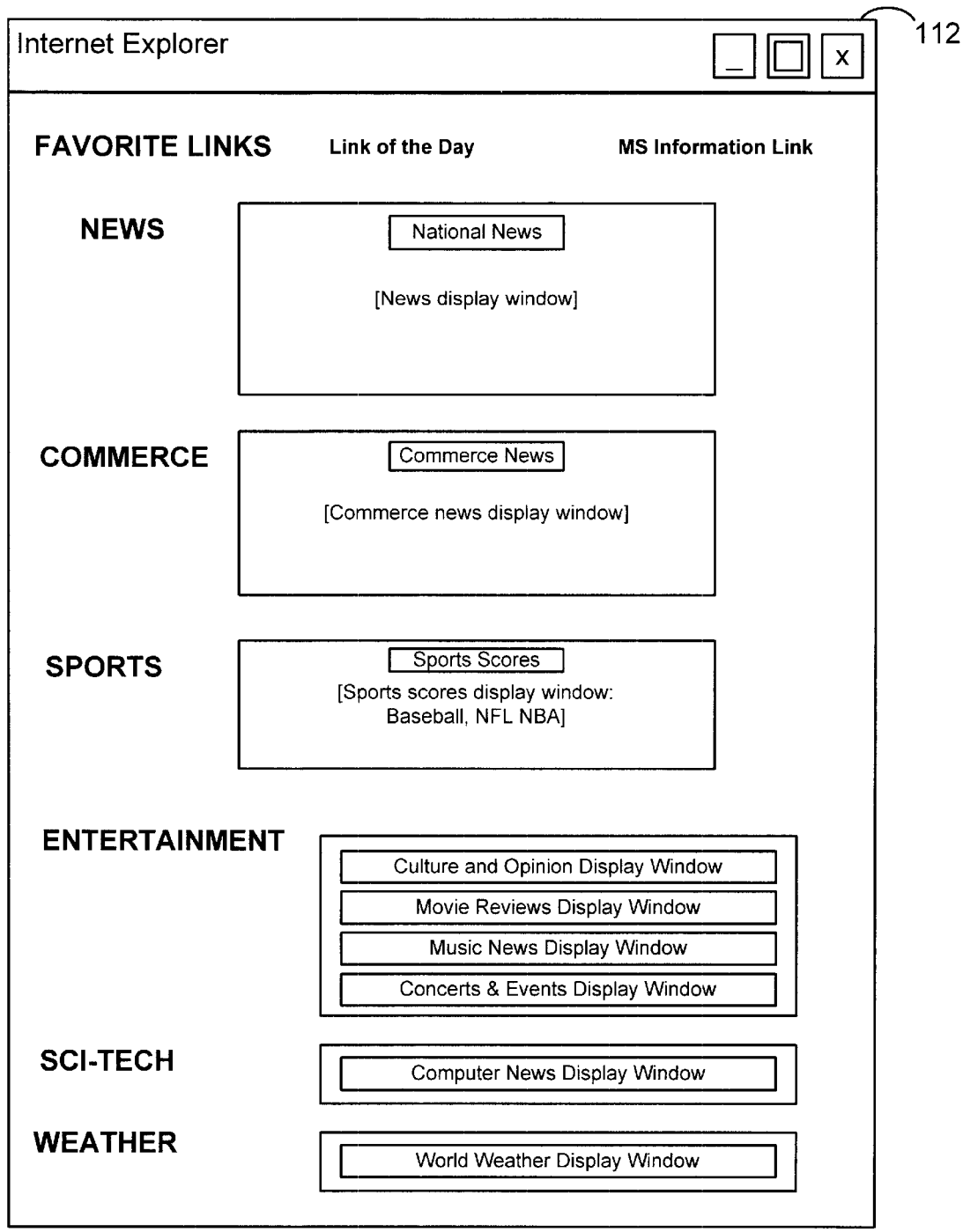
FIG. 6 is an illustration of a simplified customized HTML document.

FIG. 5 is a flow diagram of a customized HTML document delivery method 110 by which a customized HTML document 112 (FIG. 6) is delivered to user client 20. Customized HTML document 112 illustrates generally an exemplary lay-out of a customized HTML document corresponding to the exemplary selections in HTML customization document 92 (FIG. 4).

Process block 114 indicates that a user navigates client 20 to the network address (e.g., Uniform Resource Locator) of customizable HTML document at site 58. The browser on user client 20 in this step has customization persistent client state information by way of customization method 80.

Process block 116 indicates that the browser on user client 20 passes the customization persistent client state information to server 58 as a result of accessing the network address designated in the information.

Process block 118 indicates that server 58 correlates the customization persistent client state information (i.e., the user identifying information) with the customization options stored at server 58. The customization options stored at server 58 may be correlated in any conventional database format. The customization options may include a wide variety of information such as, for example, network addresses (e.g., URLs) of a user's favorite sites, types of news that the user wants to see, display information that determines how the information is presented to the user, stock ticker symbols for which the user wishes to receive stock quotes, or the city for which the user wishes to receive a weather report. The customization information can be virtually arbitrary.

The customization persistent client state information (i.e., the user identifying information) is used as an index into a database to retrieve the customization options for each user.

Process block 120 indicates that server 58 returns to user client 20 customized HTML document 112 formed in accordance with the customized options stored at server 58. With reference to the examples set forth above, server 58 can form customized HTML document 112 by displaying the user's favorite sites such that they become hotlinks that can be clicked on directly, pulling the appropriate news stories out of a database or other means of storing text articles referenced by type (e.g., URLs), changing the colors, shapes, and textures of the displayed information in accordance with the user preferences, displaying stock quotes for the companies in which the user is interested, and displaying the user's local weather report.

Having described and illustrated the principles of our invention with reference to an illustrated embodiment, it will be recognized that the illustrated embodiment can be modified in arrangement and detail without departing from such principles. It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa.

In view of the many possible embodiments to which the principles of our invention may be applied, it should be recognized that the detailed embodiments are illustrative only and should not be taken as limiting the scope of our invention. Rather, we claim as our invention all such embodiments as may come within the scope and spirit of the following claims and equivalents thereto.

We claim:

1. A method by which a client computer creates and views a customized network document, comprising:

at creation time:

accessing a network document;

reviewing a plurality of options for customizing the network document;

selecting at least one option from the plurality of options with which the network document is to be customized;

communicating the selected at least one option to a server;

receiving an identifier from the server, and storing the identifier on the client computer; and at viewing time:

accessing the network document;

receiving a request from the server for the identifier;

communicating the identifier to the server; and receiving from the server a version of the network document that has been customized with the selected at least one option.

2. The method of claim 1 wherein the identifier is a unique user identifier associated with the client computer, and wherein the client computer stores the identifier in a cookie.

3. The method of claim 2 wherein the unique identifier is a GUID.

4. The method of claim 3 wherein the GUID is a 128-bit globally unique identifier that is capable of uniquely identifying each and every user of the method.

5. The method of claim 2 wherein the cookie includes one of more network addresses for which the cookie is applicable.

6. The method of claim 2 wherein the cookie includes a date on which the cookie expires.

7. The method of claim 1 wherein the network document is in HTML format.

8. The method of claim 1 wherein the plurality of options are grouped into topical groupings.

9. The method of claim 1 wherein the network is the Internet.

10. The method of claim 1 wherein the network document is associated with a network address.

11. The method of claim 10 wherein the network address is a uniform resource locator.

12. A method of providing a customized network document over a network to each of multiple users of corresponding client computers, comprising:

from a client computer, navigating to a network address of a customizable document stored on a server computer;

if the customizable document has previously been customized from the client computer, receiving from the server computer the customized document and displaying the customized document on the client computer;

if the customizable document has not previously been customized from the client computer:

receiving on the client computer, from the server computer, a default uncustomized document and displaying the default document on the client computer, the uncustomized document containing a link to request customization options;

receiving, on the client computer, user input of a selection of the link on the default document to request customization options and transmitting the selection to the server computer;

in response to the selection of the link, receiving on the client computer a customization options page from the server computer and displaying the customization options page on the client computer;

receiving, on the client computer, user input of customization information associated with selections of desired options on the customization options page;

transmitting the customization information from the client computer to the server computer; and receiving on the client computer, from the server computer, a cookie having a globally unique identifier stored therein that uniquely identifies each user that elects customization and storing the cookie on the client computer; and upon subsequent navigations to the network address of the customizable document, transmitting the cookie from the client computer to the server computer and receiving, at the client computer, the document customized in accordance with the customization information previously provided to the server computer and displaying the customized document on the client computer.

13. The method of claim 12, wherein the customized document is an HTML document.

14. The method of claim 12, wherein globally unique identifier is 128 bits.

15. The method of claim 12, wherein the server stores the customization information in a database and the globally unique identifier is an index into the database to retrieve customization options selected by the user.

16. The method of claim 15, wherein the server generates the customized document based on the customization information and the server transmits the customized document to the client.

* * * * *

UNITED STATES PATENT AND TRADEMARK OFFICE
CERTIFICATE OF CORRECTION

PATENT NO.      : 6,647,531 B2                                                      Page 1 of 1
DATED           : November 11, 2003
INVENTOR(S)     : Isaac et al.

It is certified that error appears in the above-identified patent and that said Letters Patent is hereby corrected as shown below:

Title page,
Item [56], References Cited, OTHER PUBLICATIONS, "(Nov. 30, 1995), Microsoft Network Adds Multimedia Chat Service, Newsbytes News Network, ." should read
-- (Nov. 30, 1995) Microsoft Network Adds Multimedia Chat Service, Newsbytes News Network. --; and "Herzoff, "Cookies are not always a treat for Web users", Netowrk World, Nov. 1996, p.38." should read -- Herzoff, "Cookies are not always a treat for Web users", Network World, Nov. 1996, p.38. --.

Column 1,
Line 58, "lower levels the" should read -- lower levels of the --.

Column 2,
Line 66, "capable or providing" should read -- capable of providing --.

Column 5,
Line 34, "might not been" should read -- might not have been --.

Column 7,
Lines 22, 27, 30, 34, 38 and 46, "persistent state client" should read -- persistent client state --.

Column 9,
Line 13, "one of more" should read -- one or more --.

Signed and Sealed this

Eleventh Day of May, 2004

JON W. DUDAS
*Acting Director of the United States Patent and Trademark Office*